April 13, 1948. D. E. BOVEY 2,439,711
ELECTRICAL MEASUREMENT OF DISPLACEMENT
Filed June 14, 1943 2 Sheets-Sheet 1
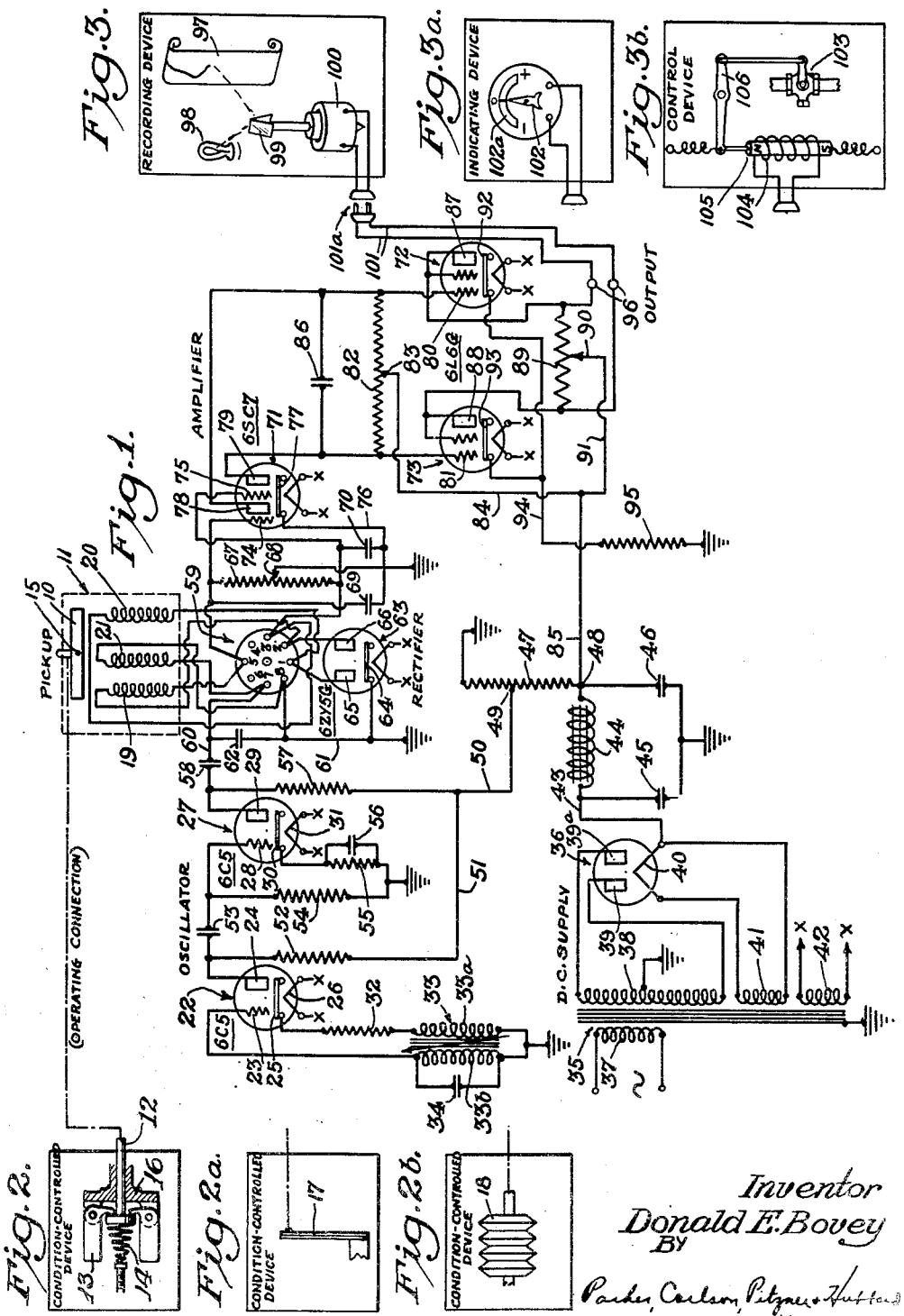
Inventor
Donald E. Bovey
BY
Parker, Carlson, Pitzner & Hubbard
Attorneys

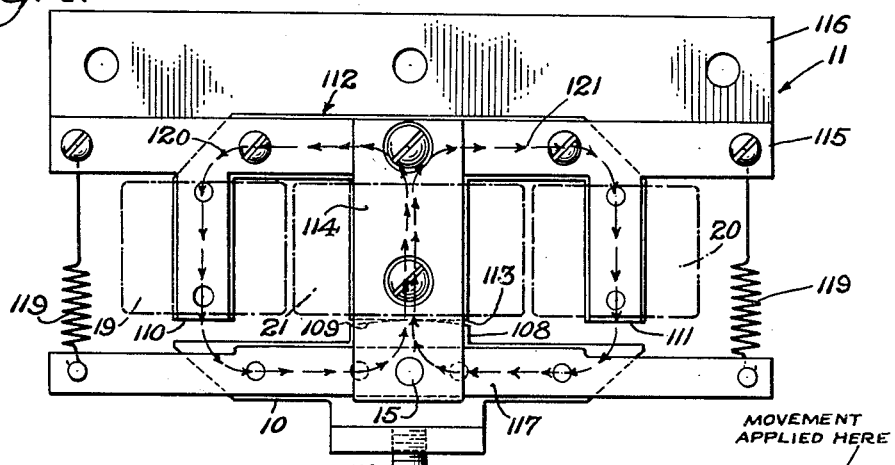
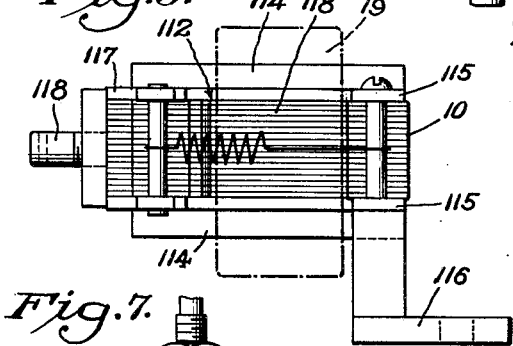
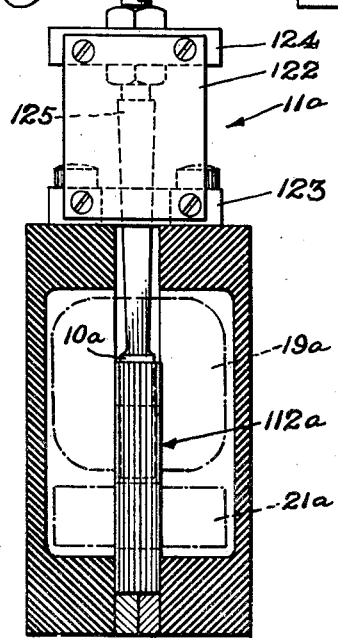
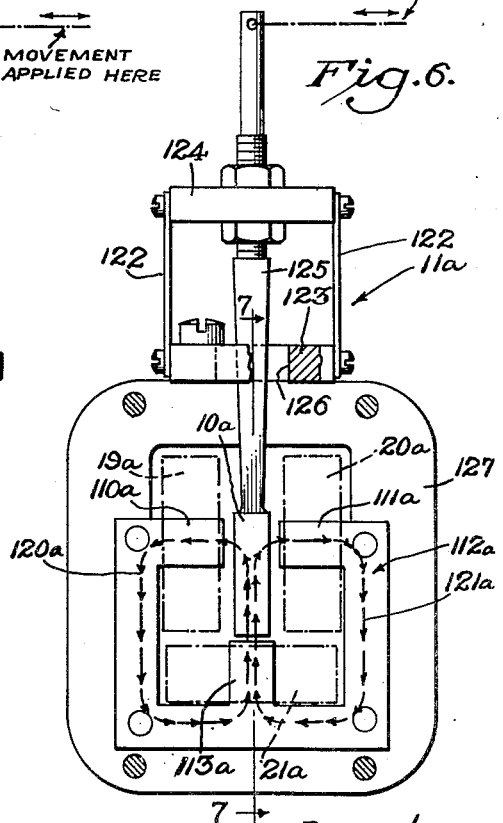

Patented Apr. 13, 1948

2,439,711

UNITED STATES PATENT OFFICE 2,439,711

ELECTRICAL MEASUREMENT OF DISPLACEMENT

Donald E. Bovey, Rockford, Ill., assignor to Woodward Governor Company, Rockford, Ill., a corporation of Illinois Application June 14, 1943, Serial No. 490,781

8 Claims. (Cl. 177—351)

The present invention relates to a method and system of electrical detection for use in apparatus for indicating, recording or controlling a change in a condition. The condition, to whose changes response is to be had, may be thermal, electrical, mechanical or chemical.

Generally stated, the object of the invention is to provide a novel method and system for electrical detection of the general class indicated and which are characterized by sensitivity, simplicity and wide range of adaptability.

More specifically, it is an object of the invention to provide a novel and improved method and system for detection in which departures from a mean value, of the condition whose changes are being detected, serves to vary simultaneously and in opposite senses two normally matched electrical quantities (i. e., two voltages or two currents) and utilizes the resulting net variation of the two, rather than one alone, to produce an electrical output characteristic varied in sense as well as magnitude in accordance with said departures.

A further object is to provide such a method and system for detection in which variations of the condition being measured are reflected as simultaneous, opposite changes in two alternating current potentials, and in which such potentials are rectified and thereafter applied in voltage opposition in a network so that the resultant or net direct current potential is of a polarity corresponding to the sense of departure of the condition from normal and of a magnitude corresponding to the extent of such departure, the use of initial alternating current potentials making possible their variation in a simple manner by variation of air gaps in flux paths associated therewith and the rectification of such potentials prior to their superposition in the network for matching purposes serving to eliminate difficulties incident to possible difference in phase of the alternating current potentials such as would be encountered if an attempt were made to combine the latter directly.

Further objects and advantages of the invention will become apparent as the following description proceeds, taken in connection with the accompanying drawings, in which Figure 1 is a circuit diagram of a detection system embodying the present invention.

Fig. 2 is a diagrammatic representation of a condition-controlled device connected to actuate the pickup of the detection system.

Figs. 2a and 2b are diagrammatic representations of alternatively available condition-controlled devices for actuating the pickup of the detection system.

Fig. 3 is a diagrammatic representation of a recording device adapted to be operated by the output of the detection system.

Figs. 3a and 3b are diagrammatic representations, respectively, of an indicating device and a control device which may be operated from the output of the detection system as alternations to the recording device of Fig. 3.

Fig. 4 is a detail front elevation of the pickup device included in the system of Fig. 1.

Fig. 5 is an end elevation of the pickup device of Fig. 4.

Fig. 6 is a side elevation of a modified form of pickup device adapted for use in the system of Fig. 1.

Fig. 7 is an end elevation of the pickup device of Fig. 6 with the casing sectioned substantially along the line 7—7 of the latter figure.

The present invention is applicable to the indicating, recording or control of an almost numberless variety of condition changes. Accordingly, certain illustrative applications of the invention have been shown herein in merely diagrammatic form and only to an extent sufficient to make plain the operation of the novel detection system. Consequently, no inference should be drawn that such applications are at all indicative of the limits of the field of use. On the contrary, it is the intention to cover all modifications, alternatives and adaptations falling within the spirit and scope of the invention as expressed in the appended claims.

The improved method includes the general steps of shifting or adjusting the position of a movable member in accordance with variations in the value of a condition to be indicated, recorded or controlled effecting equal and opposite changes in two alternating current potentials in accordance with changes in the position of said member.

The potentials are thereafter rectified, then are desirably amplified, and are finally applied in voltage opposition in an output circuit. When the controlling condition is at some selected mean or normal value the opposed potentials in such output circuit are equal, wherefore there is a zero output. Upon change of the condition in either sense from such mean value, however, the output potential will vary in proportion to such change and will be of a polarity corresponding to the sense of the change. Accordingly, the output potential may be readily utilized for governing the operation of a recording, indicating or control device in accordance with changes in the condition.

Referring now to the illustrative embodiment of the system in Fig. 1, the member which is adjusted in response to changes in the condition being detected is an armature 10 of a pickup device, designated generally by the numeral 11, and hereinafter detailed as to structure (shown in Figs. 4 and 5). In the present instance, the armature 10 is shown diagrammatically as having a mechanical operating connection with an exemplary "condition-controlled device," illustrated in Fig. 2 as a flyball governor having a rod 12 movable axially in response to changes in the radial positions of fly-weights 13 acting against a speeder spring 14 and pivotally mounted on a ball-head 16 which is rotated in unison with the mechanism whose speed is to be indicated, recorded, or regulated. Thus the armature 10 is tilted about its central pivot point 15 in accordance with changes in speed which is the condition whose value is measured. Alternatively, the armature 10 may be joined by a suitable operating connection to a thermally responsive element such as a bimetallic strip 17 (Fig. 2a) which therefore positions the member 10 in accordance with ambient temperature changes. Similarly, the armature may be connected to a flexible bellows 18 (Fig. 2b) so as to respond to pressure changes. In fact, the armature may be adjusted selectively by any desired "condition-controlled device" which is adapted to move in response to changes in any condition, the value of which is to be indicated, recorded, controlled or regulated. When the condition is at some selected mean or normal value, the armature 10 occupies its central position shown, and is tilted about its pivot 15 in opposite directions in accordance with the sense of the departure of the condition from normal and by an amount proportional to the magnitude of such departure.

Such movement of the armature 10 is used to vary simultaneously and in opposite senses two alternating current potentials in windings 19 and 20 of the pickup device 11, the armature being disposed in the paths of fluxes linking these windings so that its movement from the central position shown varies the reluctance of such paths in opposite senses. To facilitate the connection of these windings 19, 20 for independent rectification of their respective potentials, they are preferably excited inductively rather than directly, and the armature 10 disposed in the mutual inductance paths between the respective windings 19, 20 and a primary or exciting winding 21. The latter thus functions, in effect, as a transformer primary and the windings 19, 20 function as transformer secondaries. When the armature 10 is in its central or mid position shown, the reluctance of the paths of flux linking the exciting winding 21 to the respective secondaries 19, 20 are equal and, accordingly, the potentials induced in the two identical windings 19, 20 are equal.

Turning the armature 10 clockwise about its pivot 15 brings it into closer proximity to the winding 20 and simultaneously moves it further away from the winding 19. Consequently, the reluctance of the flux path linking the windings 20, 21 is diminished, while the reluctance of the path linking the windings 19, 20 is increased simultaneously. As a result, the potential induced in the winding 20 is increased and that in the winding 19 diminished. Opposite changes take place when the armature 10 is turned in a counterclockwise direction. Such an arrangement affords a very sensitive pickup device in that when a change in the potential in one winding takes place, a change of equal magnitude but opposite sense takes place in the potential of the other winding, and these simultaneous changes are used, as detailed below, to augment each other in proportionately varying the output of the system.

Excitation for the primary winding 21 may be furnished from any suitable source of alternating current. Preferably the excitation frequency is high, that is, of the order of about 5,000 C. P. S., in order to minimize the problem of filtering out the ripple from the rectified outputs of the windings 19, 20. In the present instance an oscillator of conventional design has been shown as arranged for exciting the primary winding 21. This oscillator comprises a type 6C5 triode 22 having a grid 23, an anode 24, and a cathode 25 with heater 26. Also included in the oscillator circuit is a second type 6C5 triode 27 connected for operation as an amplifier and having a grid 28, an anode 29, and a cathode 30 with heater 31. In the input circuit of the tube 22 the primary winding 33a of a variable mutual inductance 33 and a resistor 32 are connected between the cathode and ground while the other winding 33b of the inductance is shunted by a condenser 34. Adjustment of the inductance 33 serves, in the usual manner, to determine the oscillator frequency.

Plate voltage for the various tubes in the circuit is derived from an ordinary direct current supply network, shown in this instance as comprising a transformer 35 and a rectifier 36. Primary winding 37 of the transformer 35 is excited from any suitable source of alternating current, as for example at 60 cycles and 110 volts, and the end terminals of its secondary winding 38 are connected to the plates 39, 39a of the rectifier 36, the center tap of the secondary being grounded. Cathode 40 of the rectifier is connected across a tertiary winding 41. Incidentally, an additional winding 42 of the transformer supplies current at low voltage to the cathode heaters of the various tubes, the individual connections thereto being omitted for simplicity. The rectifier cathode 40 is connected through an output lead 43 to a filter comprising a choke 44 and condensers 45, 46 connected to ground from its opposite end terminals. A voltage divider resistor 47 is connected from the output terminal 48 of the filter to ground, whence the circuit is completed back to the center tap of the transformer winding 38, and plate voltages of desired value can be tapped off from the resistor 47.

In the case of the oscillator tube 22, plate voltage is supplied from a tap 49 on the resistor 47 and through leads 50, 51 and a load resistor 52. The output of the tube 22 is coupled through a condenser 53 to the input of the amplifier tube 27. Thus, one terminal of the condenser 53 is connected to the grid 28 of the latter tube, such grid being connected to the cathode 30, resistors 54, 55 and condenser 56 in shunt with the latter resistor. Plate voltage is applied to this tube 27 from the tap 49 on the resistor 47 through the lead 50 and a load resistor 57. The output of the tube 27 is coupled to the primary winding 21 of the pickup device 11 through a condenser 58, connections being established through an octal plug and socket indicated at 59.

All connections from the pickup device 11 to the remainder of the circuit are established through six of the eight terminals (numbered 1 to 8) of the octal plug and socket whereby the leads from the pickup device may be enclosed in a cable to facilitate placing of the pickup device adjacent a machine being tested or in any other desired location. Thus the terminals of the exciting winding 21 are connected to terminals 7, 8 on the plug; the terminals of the secondary winding 19 are connected to terminals 2, 5 on the plug; while the terminals of the other secondary winding 20 are connected to terminals 1, 3 on the plug. The coupling condenser 58 from the oscillator is connected through lead 60 to terminal 7 on the socket while terminal 8 on the socket is connected to ground through lead 61. A condenser 62 is connected between leads 60, 61. In this way the winding 21 is connected in the output circuit of the oscillator amplifier tube 27 (that is, in circuit 29—58—60—7—21—8—61—ground—55—30) for excitation of the winding by the amplified high frequency output of the oscillator.

The potentials which are induced in the secondary windings 19, 20 of the pickup device 11 are applied to two input circuits of the system and the currents circulated thereby in such input circuits are rectified independently. A type 6ZY5G rectifier tube 63 having an indirectly heated cathode 64 and a pair of anodes 65, 66 is shown as connected for this purpose. Thus, one terminal of the winding 20 is connected to the rectifier anode 65 through plug terminal 1, while one terminal of the other winding 19 is connected to the other rectifier anode 66 through the plug terminal 2. The remaining terminals of the windings 19, 20 are connected through plug terminals 5 and 3, respectively, to opposite ends of a resistor 67 having an adjustable center tap 68 through which the circuit is completed to ground and thence back to the rectifier cathode 64. It will thus be seen that the rectified currents resulting from the potentials induced in the windings 19, 20 traverse respective portions (approximately halves) of the resistor 67, and by adjustment of the center tap 68 of the latter the voltage drops across such portions of the resistor 67 can be easily and exactly balanced when the armature 10 is in its predetermined neutral or mid position. Condensers 69 and 70 are connected across the portions of the resistor 67 energized from the respective windings 19, 20 and are, accordingly, charged by potentials which are proportional to those induced in the corresponding ones of such windings 19, 20. These condensers, which charge to peak voltages almost equal to the voltage drops across the corresponding portions of resistor 67, afford some filtering ahead of the direct current amplifier. They do, however, introduce some time lag in the system, thereby impairing the precision of the system at high rates of change in the condition being detected. Accordingly, they should be omitted or not, depending upon whether or not greater accuracy is desired at the expense of an increase in the amount of ripple of excitation frequency.

Desirably, the rectified potentials across the condensers 69, 70 are amplified individually before being applied in voltage opposition in the output of the network. For that purpose two-stage direct current amplification is used herein, the circuits for amplifying the two potentials being, in fact, independent in their functioning although closely related as to connections in order to simplify the layout. The first stages of such amplifier circuits comprise the respective triode portions of a type 6SC7 duplex triode tube 71, while the second stages comprise respective screen grid type 6L6G tubes 72, 73 connected to operate as triodes.

In the specific amplifier circuit shown, one terminal of the resistor 67 is connected to grid 74 of one triode section of the tube 71, while the other terminal of the resistor 67 is connected to the grid 75 of the other triode section of such tube. The input circuits of the tube are completed through a lead 76 from the remaining or common terminals of condensers 69, 70 to the cathode 77. On the output side of the tube 71 the anodes 78, 79 are respectively connected to the input or control grids 80, 81 of the second stage tubes 72, 73. Plate voltage is applied to the anodes 78, 79 of the tube 71 from respective portions of a resistor 82 having its end terminals connected thereto and its center tap 83 connected to the output terminal 48 of the plate supply, heretofore described, through leads 84, 85. A condenser 86 may be shunted across the resistor 82 as shown to minimize the ripple in the direct current output of the tube 71 although, as heretofore mentioned in connection with condensers 69, 70, this is done at the expense of some time lag, and should therefore be used or not, depending upon the characteristic desired.

From the foregoing it will be seen that the input bias on the grids 80, 81 of the second stage tubes 72, 73 is varied in accordance with the outputs of the respective triode sections of the first stage tube 71, and that the latter are in turn proportional to the potentials induced in the windings 19 and 20, respectively. On the output sides of the second stage tubes 72, 73 their anodes 87, 88 are connected to opposite end terminals of a load resistor 89 having a center tap 90 connected through leads 91, 85 to the output terminal 48 of the heretofore described plate voltage supply network. The cathodes 92, 93 of the tubes 72, 73 are connected to ground through a common lead 94 and resistor 95. It will thus be seen that the outputs of the second stage tubes 72, 73 are applied in voltage opposition on the resistor 89, wherefore the direct current potential appearing between output terminals 96 for the network, which are connected to the opposite ends of the resistor 89, is proportional to the net difference between the potentials induced in the pickup windings 19, 20. In other words, such output voltage is of one polarity when the armature 10 shifts in one direction, of the opposite polarity when the armature shifts in the opposite direction, and in either case of a value proportional to the extent of such shift of the armature.

In Figs. 3, 3a and 3b are diagrammatically illustrated a recording device, an indicating device and a control device, respectively, and which are representative of the general class of mechanisms that may be actuated from the output terminals of the detector system. Thus, Fig. 3 represents a "recording device" in the form of a conventional oscillograph providing a moving strip of film 97 on which a beam of light from source 98 is reflected by mirror 99 in the usual manner. Actuating winding 100 of the oscillograph is energized through leads 101 and a suitable plug connection 101a from the output terminals 96. The "indicating device" of Fig. 3a represents simply a voltmeter having a needle 102 also adapted to be operated from the detector system, and which may be provided with a scale 102a suitably calibrated for indicating various condition changes. Similarly, the "control device" of Fig. 3b is shown diagrammatically as comprising a regulating valve 103 operated by a solenoid 104 adapted to be energized from the output of the detector system and having a spring-centered, polarized armature 105 connected to the valve element through linkage 106. Of course, the motion of the armature 105 may be utilized to control the operation of a suitable servo actuator including follow-up mechanism for effecting power actuation of the device ultimately to be positioned in accordance with the changing values of the controlling condition. It will be observed that the series of devices of Figs. 3, 3a and 3b have in common the feature that each of them embodies a movable element which is adapted to be moved from a central or neutral position in opposite directions in accordance with the polarity of the output of the detector system and through a distance proportional to the magnitude of such output.

From the foregoing the operation of the system disclosed will, in general, be clear. By way of brief résumé, such operation will be reviewed with reference to the conditions prevailing when the pickup device 11 is mechanically connected to the governor 14 of Fig. 2 and the output terminals 96 connected to the operating winding 100 of the oscillograph of Fig. 3. It may be further assumed that alternating current is being supplied to the input winding 37 of the supply transformer 35 and that the detection system has been properly adjusted so that the output potential at terminals 96 is zero when the armature 10 is in its predetermined or mid position. The mechanical "operating connection" from the armature 10 to the collar 12 of the flyball governor is such that the armature occupies its mid position, as shown, when the governor 14 is turning at some predetermined speed.

Under such conditions, and so long as the governor continues to revolve at precisely such predetermined speed, the alternating current potentionals induced in the windings 19, 20 from the winding 21, which is suitably excited by the oscillator, will be equal. Consequently, the negative biases on the grids 74, 75 of the tube 71 will be equal, as will the biases on the grids 80, 81 of the second stage amplifier tubes 72, 73, wherefore the direct current output potentials from the latter tubes applied to the resistor 89 are equal and opposite so that there is a zero voltage at the output terminals 96. In such case the mirror 99 of the oscillograph (Fig. 3) remains stationary and the trace on the film 97 is a straight line. Upon any slightest change in speed of the governor 14, however, the oscillograph mirror 99 will turn proportionately, and in a corresponding direction to record such change by shift in the beam of light which forms the trace on the film 97. For example, if the governor 14 increases in speed of rotation slightly, it will pivot the armature 10 counterclockwise. This decreases the reluctance of the flux path linking the winding 19 and at the same time increases the reluctance of the flux path linking the winding 20, so that the alternating current potential in the winding 19 is increased and that in the winding 20 decreased. In such case the direct current potential across the condenser 69 is increased and that across the condenser 70 decreased, whereby the grid 74 becomes more negative and the grid 75 less negative. This raises the plate resistance in the triode section 73, 74, 77 and lowers the plate resistance in the other triode section 79, 75, 77. The latter changes in turn raise the potential of the grid 80 in the second stage tube 72 and lower the potential of the grid 81 in the other second stage tube 73, wherefore more plate current flows in the output of the tube 72 and less in the output of the tube 73. The voltage drop in the resistor 89 resulting from the output of the tube 72 thus overbalances the opposed voltage drop resulting from the output of the tube 73 so that a net output potential of corresponding magnitude and polarity is applied to the operating winding 100 of the oscillograph, thereby causing it to shift the mirror 99. Further increase in the speed of the governor 14 will cause such output voltage to increase proportionately and in the same sense.

Upon a subsequent decrease in the governor speed, however, the armature 10 will pivot back in a clockwise direction, thus causing the potentials in the system to change in a reverse sense to that heretofore described. After the armature 10 passes its neutral or mid position shown the polarity at the output terminals 96 will reverse and thereafter increase in an opposite sense as the armature 10 continues to shift clockwise. In this way the output potential of the system is caused to change with precision in accordance with even minute changes in the condition to which the system is made responsive.

Attention may now be given to details of an exemplary construction for the pickup device 11, as illustrated in Figs. 4 and 5. As shown in the latter figures, the windings 19 and 20 encircle the outer legs 110, 111 of a laminated E-shaped core 112, made of soft iron. The exciting winding 21 embraces the central leg 113 of this core. The armature 10, which is also made of laminated soft iron, extends between the ends of the outer core legs 110, 111 and has a central projection 108 thereon presenting a curved face 109 to the adjacent end face of the central leg 113. The pivot pin 115 for the armature 10 is supported between a pair of frame members 114 fixed to a pair of face plates or frame members 15 disposed on opposite sides of the core 112 and through-bolted thereto. Rigid with one of these frame members 115 is an L-shaped mounting bracket 116. The laminations of the core 10 are fixed in a generally channel-shaped frame 117 having a pin 118 fixed thereto for connection of the armature to the condition-controlled device that is to move the same.

For yieldably holding the armature 10 in its centered position, tension springs 119 may be provided, extending from the outer ends of the frame 117 to the adjacent outer ends of the core frame 115. Such spring loading of the armature adapts it to the measurement of force as well as deflection, although the spring loading of the modified form of pickup device hereinafter described in connection with Figs. 6 and 7 is somewhat better adapted for that purpose. It will be evident that the springs 119 may be omitted from the device of Figs. 4 and 5 if it is desired that the pickup be sensitive simply to movement alone and with the application of substantially no change in load to the device which moves it.

In the operation of the pickup device of Figs. 4 and 5 the air gaps between the ends of the core legs 110, 111 and the adjacent portions of the armature 10 are equal when the armature is in its central or mid position. Consequently, the flux paths linking the exciting winding 21 with the secondary windings 19, 20 are of equal reluctance, these flux paths being indicated by the arrow lines 120 and 121 in Fig. 4. As the armature 10 tilts clockwise (as viewed in Fig. 4) the air gap to the core leg 110 is diminished, while that to the core leg 111 is correspondingly increased. This results in a corresponding change in the flux traversing the paths 120, 121, that in the path 120 increasing and that in the path 121 decreasing so that, correspondingly, the voltage induced in the winding 19 is increased and that in the winding 20 decreased. Shift of the armature 10 in the opposite direction to decrease the air gap between it and the core leg 111 and to increase that to the leg 110 will result in a corresponding increase in the voltage induced at the winding 20 and decrease in that induced in the winding 19.

In Figs. 6 and 7 a modified form of pickup device, designated generally as 11a, has been illustrated and which is suitable for use in the detection system heretofore described in lieu of the pickup device 11. In this instance the pickup device 11a comprises an exciting winding 21a coacting with secondary windings 19a, 20a and an armature 10a. The windings are again mounted on a laminated soft iron core 112a of what might be termed an E-shape, although the main outer legs of the core have opposed projections 110a, 111a, which carry the secondary windings 19a and 20a. The exciting winding 21a encircles a short central core leg 113a. The armature 10a is generally rectangular in shape and its outer end lies adjacent the end of the core leg 113a, while the upper portion of the armature is disposed between the opposed faces of the core legs 110a and 111a, being equally spaced from the latter when in its position of rest. In such case the flux induced by the exciting winding 21a traverses the paths of equal reluctance indicated generally by the arrow lines 120a and 121a and linking the respective windings 19a and 20a.

A parallel motion support for the armature 10a is afforded by a pair of leaf springs 122. The lower ends of these springs are screwed to a supporting block 123 while their upper ends are screwed to a second block 124. Fixed in this latter block is a stem 125 to the lower end of which the armature 10a is rigidly attached. The upper end of the pin 125 is adapted for attachment to a member moved in accordance with the condition whose changes are being detected. A pin 125 extends through a central opening 126 in the lower supporting block 123. By virtue of this mounting arrangement, when the upper end of the pin 125 is moved laterally the armature 10a on its lower end will be correspondingly moved, the armature remaining parallel at all times to the opposed faces of the core leg projections between which it is located. Such movement of the armature changes the lengths of the air gaps between it and the projections in the core legs 110a, 111a to alter the potentials induced in the windings 19a, 20a in the same general manner as heretofore described with reference to the windings 19, 20 of the pickup device 11. In the device of Figs. 6 and 7 the core 112a is clamped in complemental recesses in the opposed faces of a pair of non-magnetic frame members 127, to the top of which the mounting block 123 is fixed.

I claim as my invention:

1. In a system for producing an output signal which varies substantially proportionately with changes in a condition, the combination of an electromagnetic pickup device comprising an exciting winding and two secondary windings together with a movable armature for varying the inductive couplings between said exciting winding and respective ones of said secondary windings simultaneously and in opposite senses as said armature is moved in opposite directions from a neutral position, means for moving said armature in response to changes in said condition, means for energizing said exciting winding with alternating current to induce alternating current potentials in said secondary windings, an output circuit, means for separately rectifying prior to amplification the alternating current potentials induced in said secondary windings and means for separately amplifying the direct voltage outputs of the last-mentioned means while maintaining the direct voltage nature thereof and for thereafter applying the resulting amplified direct current potentials to said output circuit in voltage opposition to each other, whereby the net potential in said output circuit is varied in polarity in accordance with the direction of movement of said armature from its neutral position and in magnitude substantially proportionately with extent of such movement of the armature.

2. In a system for producing an output which varies substantially proportionately with changes in a condition, the combination of an exciting winding and two secondary windings inductively coupled therewith, means for energizing said exciting winding with alternating current to induce alternating current potentials in said secondary windings, means for varying simultaneously and in opposite senses the reluctance of the magnetic circuit joining said exciting winding and respective ones of said secondary windings in accordance with changes in said condition, two input circuits connected to respective ones of said secondary windings, means for rectifying independently of each other the currents circulated in said circuits as a consequence of the potentials induced in said secondary windings and for producing direct current potentials by the rectified currents, an output circuit, and means including two direct coupled thermionic amplifiers for separately amplifying said direct potentials while maintaining the direct voltage nature thereof and applying the same to said output circuit with the resulting amplified direct current potentials in voltage opposition to each other.

3. In a system for having an input and an output and producing an output signal substantially proportional to a change in a condition affecting the input, the combination of two independent input circuits, means for applying to said input circuits alternating current voltages which are normally of equal values, means for varying said voltages simultaneously and in opposite senses from their normal values substantially proportionately to departure from a mean value of the condition whose changes are to be detected, means for rectifying independently of each other the currents in said circuits resulting from the voltages applied thereto and for producing direct current potentials by the rectified currents, an output circuit, and direct coupled amplifier means for separately amplifying the direct potentials produced by the last-mentioned means while constantly maintaining the direct voltage nature thereof and applying the resultant amplified direct potentials to said output circuit in voltage opposition to each other.

4. The method of detecting the extent and sense of displacement of a member from some mean position thereof, which comprises, producing two alternating voltages which are normally of equal value, varying said voltages simultaneously and in opposite senses proportionately to the displacement of said member from its mean position, rectifying independently of each other currents resulting from said voltages, producing direct voltages by rectified currents, separately amplifying said direct voltages into direct voltages of greater magnitude but of the same proportionality with reference to each other while constantly maintaining the direct voltage nature thereof, and combining in polar opposition said amplified direct current voltages, whereby the polarity of the resultant of such combination corresponds to the sense of deviation of said member and the magnitude of the resultant is proportional to the extent of such deviation.

5. In a system for detecting changes in a condition, the combination of an electromagnetic pickup device comprising an exciting winding and two secondary windings together with a movable magnetic armature for varying the reluctance of the magnetic path between said exciting winding and respective ones of said secondary windings simultaneously and in opposite senses as said armature is moved in opposite directions from a neutral position, means for moving said armature substantially proportionately to changes in said condition, means for energizing said exciting winding with high frequency alternating current to induce alternating current potentials of corresponding high frequency in said secondary windings, a resister having end terminals and an adjustable center tap, means for rectifying independently of each other the alternating current potentials induced in said secondary windings and applying the same to the portions of said resister lying between respective ones of said end terminals and said center tap, whereby said center tap may be adjusted to equalize the direct current voltage drops across said portions of the resister when said armature is in a desired mean position therefor, an output circuit, and means including two thermionic direct coupled amplifiers for amplifying said direct current voltage drops into direct current voltages of greater magnitude but like proportionality to each other and applying the same to said output circuit in voltage opposition to each other.

6. In a system for detecting changes in a condition and for energizing a registering device in accordance with such changes, the combination of an electromagnetic pickup device comprising an exciting winding and two secondary windings together with means for varying the reluctance of the magnetic path between said exciting winding and respective ones of said secondary windings simultaneously and in opposite senses as said armature is moved in opposite directions from a neutral position, means for moving said armature substantially proportionately to changes in said condition, means for energizing said exciting winding with high frequency alternating current to induce alternating potentials in said secondary windings, resistor means having two sections, means for rectifying independently of each other the alternating potentials induced in said secondary windings and applying the same to the sections of said resistor, said resistor sections having resistance such that the direct voltage drops across said sections respectively are equal when said armature is in a desired mean position therefor, an output circuit for connection to said registering device, and means including two thermionic direct coupled amplifiers for proportionally amplifying said direct voltage drops into direct voltages of greater magnitude and applying the same to said output circuit in voltage opposition to each other.

7. In a system having an input and an output and producing a direct output signal substantially proportional to a change in a condition effecting the input, the combination comprising two independent input circuits, means for applying to said input circuits alternating voltages which are normally of equal value, means for varying said voltages simultaneously and in opposite senses from their normal values substantially proportionally to departure from a mean value of the condition whose changes are to be detected, means for rectifying independently of each other the currents in said circuits resulting from the voltages applied thereto and for producing direct potentials by the rectified currents, an output circuit, direct coupled amplifier means for amplifying the direct potentials produced by the last mentioned means and applying the resultant amplified direct potentials to said output circuit in voltage opposition to each other, and filter means associated with the input portion of said direct coupled amplifier means for filtering out alternating components in the rectified wave which are at the frequencies of the alternating voltage input and to enable direct connection of the amplifier means to a load requiring substantially pure direct voltage.

8. In a device suitable for exciting an oscillograph or the like having a low impedance with direct voltage of a magnitude depending upon a condition being measured, the combination comprising an exciting winding, two secondary windings inductively coupled thereto, means for energizing the exciting winding with alternating current to induce alternating potentials in said secondary windings, means for varying simultaneously and in opposite senses the inductive coupling between said exciting winding and respective ones of said secondary windings in accordance with changes in said condition, two input circuits connected to respective ones of said secondary windings, means for rectifying independently of each other the potentials induced in said secondary windings, means including two direct coupled amplifiers for amplifying said direct potentials and having an output circuit connecting the output signals thereof in opposition, said amplifiers including biasing means such that the output signal is substantially proportional to the input signal and including filter means in the grid circuits thereof for filtering out signal components at the frequency of said alternating current so that said low impedance load may be supplied with a proportional and substantially pure direct voltage directly from said output circuit.

DONALD E. BOVEY.

REFERENCES CITED

The following references are of record in the file of this patent:

UNITED STATES PATENTS

| Number | Name | Date |
|---|---|---|
| 1,959,804 | Wittkuhns et al. | May 22, 1934 |
| 1,964,141 | Rhodes et al. | June 26, 1934 |
| 2,126,910 | Moseley | Aug. 16, 1938 |
| 2,258,837 | Zusehlag | Oct. 14, 1944 |
| 2,268,956 | Mestas | Jan. 6, 1942 |
| 2,285,540 | Stein et al. | June 9, 1942 |
| 2,324,215 | Kingsburg | July 13, 1943 |
| 2,340,609 | Mestas | Feb. 1, 1944 |